United States Patent [19]

Noack

[11] 4,424,838

[45] Jan. 10, 1984

[54] ARRANGEMENT FOR PROTECTION OF METAL SURFACES AGAINST CORROSION

[76] Inventor: Fritz Noack, Ganghoferstr. 12, D-8942 Ottobeuren, Fed. Rep. of Germany, D-8942

[21] Appl. No.: 236,497

[22] Filed: Mar. 12, 1982

[30] Foreign Application Priority Data

Feb. 23, 1980 [DE] Fed. Rep. of Germany ....... 3006908

[51] Int. Cl.³ .............................................. B65B 3/04
[52] U.S. Cl. ...................................... 141/325; 422/8; 428/36
[58] Field of Search ............... 427/388.1, 421; 141/99, 141/325, 326, 327; 239/450, 542, 547; 134/36; 422/7, 8; 118/317, 254, 313, 264; 428/36

[56] References Cited

U.S. PATENT DOCUMENTS 3,448,717  6/1969  Kuhlman ...................... 118/317 X

FOREIGN PATENT DOCUMENTS 2035851A  6/1980  United Kingdom ............... 118/317
2069880   9/1981  United Kingdom .

Primary Examiner—Thurman K. Page
Attorney, Agent, or Firm—Angelo Notaro

[57] ABSTRACT

A method for protection of metal surfaces against corrosion especially for use in automobiles consists in that a tube manifold system is connected with a central supply station containing an anticorrosive agent. Branch tubes of the manifold are connected with a plurality of metal surfaces and perforated in the area of the surfaces in order to distribute the agent over the surfaces when a pressure is generated in the supply station. The metal surfaces are covered by a layer of absorbent material which is saturated with the anticorrosive agent to provide for a long-time protection.

11 Claims, 5 Drawing Figures

ARRANGEMENT FOR PROTECTION OF METAL SURFACES AGAINST CORROSION

BACKGROUND OF THE INVENTION

The invention refers to a method and an arrangement for protection of metal surfaces against corrosion.

OBJECTS AND SUMMARY OF THE INVENTION

One object of the invention is to provide a method and an arrangement for protecting of ironwork, steel plates and similarly corrodible structures, especially in automobiles but not limited thereto.

A further object is to provide a new concept for protecting corrodible steel surfaces against corrosion providing a system for generating, maintaining and regenerating a protective film ofan anticorrosive medium on said surfaces.

A method according to this invention comprises the steps of providing a plurality of small bores in the wall of a tube portion of a tube, arranging the tube portion at one of said metal surfaces, connecting said tubes to form a manifold system, providing at least one supply pipe for the manifold system, and intermittently proportioning an anticorrosive fluid under pressure into the supply pipe to form or regenerate a protective film of said fluid on said metal surfaces.

This method further comprises the steps of at least punctually adhering the preferably flexible tubes or hoses at the metal surfaces and thereafter spraying a material layer on the metal surface which consists of an expandable liquid forming an open-cellular foam after hardening. While this method is especially advantageous to protect non-accessible places, for example, closed hollow chambers, in the case of places which are accessible also prefabricated layers of absorbent material as felt can be fastened at the steel surfaces. In order to minimize evaporation of the anticorrosive medium, one further feature of the invention resides in that a fluid-tight cover is sprayed on or provided at the absorbent material layer.

An arrangement according to the invention comprises a material layer covering each of said metal surfaces, a distribution tube system consisting of a plurality of branch tubes, each branch tube opening into said material layer or into the space between the metal surface and the material layer and at least one central supply pipe connected with the tube system and provided for connection with a pressurized supply of an anticorrosive fluid to form or regenerate a protective film an said metal surfaces, whereby according to a further feature each branch tube is provided with at least one delivery portion in which a plurality of small bores in the form of needle stitches are provided with lengthwise spacings.

Instead of using a layer of open-cellular foam forming a plurality of capillary channels filled with anticorrosive fluid an alternative embodiment consists in that the surface of the material layer facing the metal surface is provided with a plurality of protrusions between which flow channels are formed which are in fluid connection with the branch tube, and wherein the material layer is punctually adhered to the metal surface.

The main supply pipe in the case of an automobile can easily be connected with a delivery hose of a supply device at a service station in order to feed pressurized anticorrosive fluid into the system during the period in which the vehicle is filled up with fuel. According to an alternative embodiment, the central supply pipe is connected with a storage container filled with anticorrosive fluid and provided with hand-operated pressure generating means, whereby the storage container is installed in the vehicle.

Anticorrosive fluids which can be used in this invention are of known composition which are available as creeping oils. Preferably, such oils are used in the form of a gaseous composition containing the oil in atomized form instead of droplets. At least in the case of an external supply device the composition is fed under a pressure in the region of 4 to 6 kg/cm$^2$.

In most cases, it is sufficient to operate the anticorrosion-system several times per year in order to regenerate the oil-films at the corrodible steel surfaces. However, under extreme conditions, the system should be operated monthly.

BRIEF DESCRIPTION OF THE DRAWINGS

Further features and advantages of the invention will be gained from the following description of the drawings in which.

DETAILED DESCRIPTION

Figure 1:
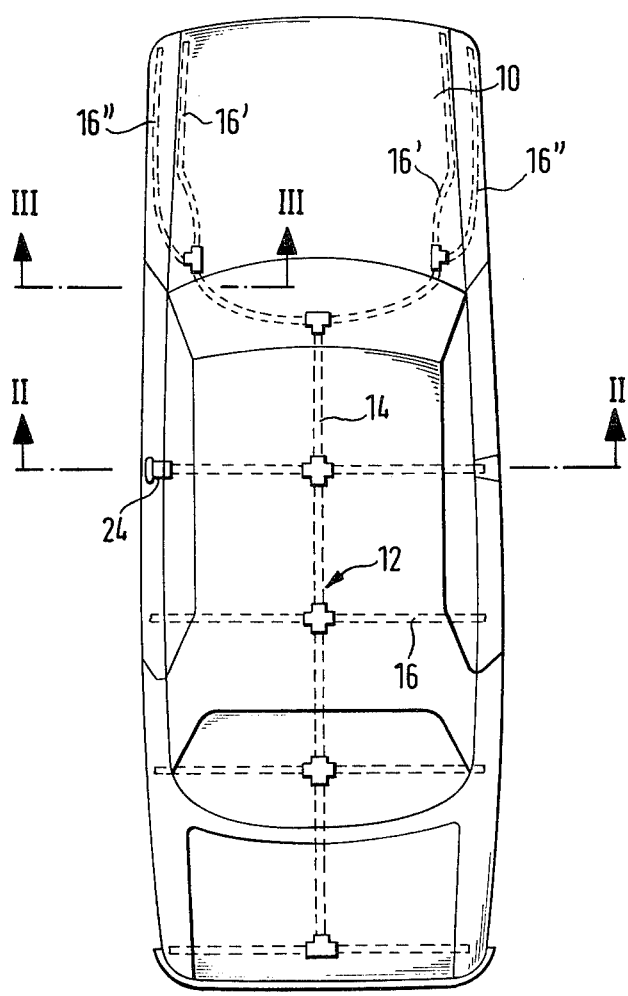
FIG. 1 is a schematical plan view of an automobile showing the system for delivering of an anticorrosive fluid to corrodible steel plates in dotted lines.

An automobile 10, according to FIG. 1, is provided with a manifold or tube distributing system 12 which is compared with at least one main tube or hose 14 and branch tubes or hoses 16. FIG. 1 is only a schematic representation. In practice, the branch tubes, 16 extends from the main tube 14. The branch tubes 16 themselves are divided in form of ramifications 16', 16" of an artery. The branch tubes 16 and the main tube 14 have needled tube portions 16', 16", i.e. tube portions in which a plurality of stitch-like bores 42 are provided. These tube portions are distributed over all corrodible outer surfaces of the body sheets of the vehicle and also extend into the cavities of the vehicle body, for example, hollow door posts and double-walled doors. The manifold 12 is punctually fixed at the sheets of the vehicle body such that the bores 42 (FIG. 5) are situated in that tube half facing the sheet.

The main tube or main tubes 14 are provided with at least one supply fitting 24, which forms a plug type connection and which can easily be connected with a storage tank which contains a pressurized mixture of a gaseous medium such as air and an anticorrosive fluid as oil in atomized form. The aerosol fills the manifold 12 and is discharged through the bores 42 and is admitted to the steel sheet surfaces 20 to be protected. The needled tube portions 16', 16" are arranged at interspaces small enough to provide a protective film of anticorrosive medium on the steel plate surfaces. Because the oil film tends to evaporate, after a certain period, mainly depending on the temperature of the atmosphere, a regeneration of the protective film must take place in for example one-month-periods.

Figure 2:
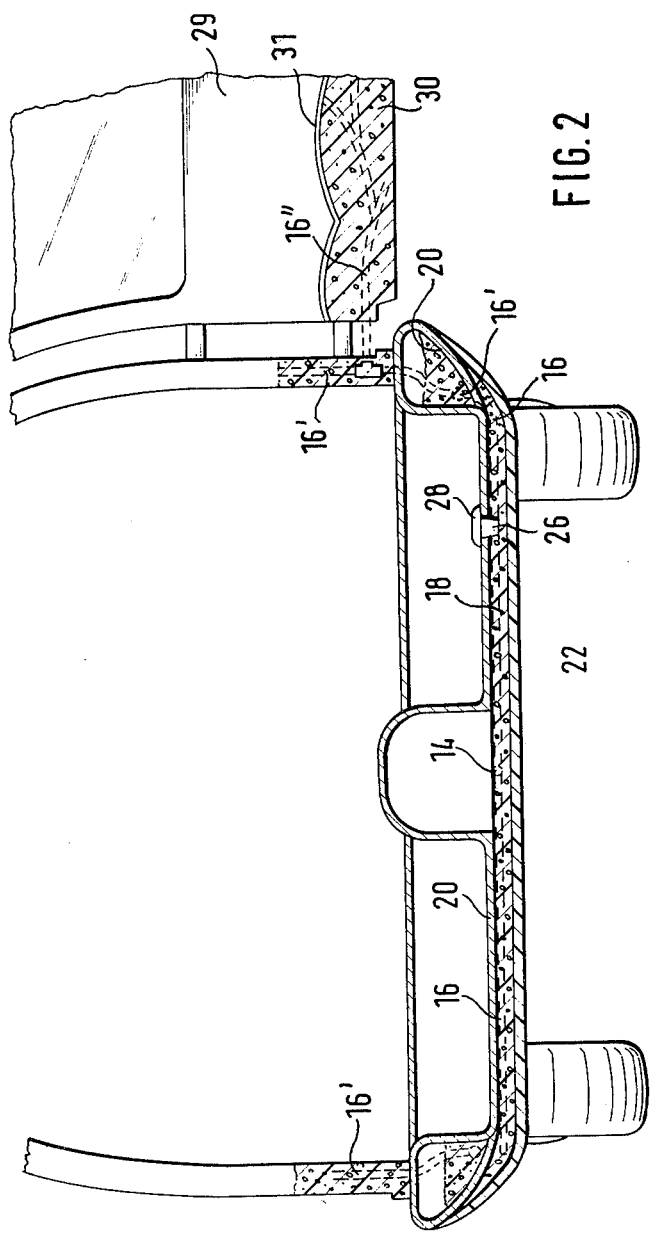
FIG. 2 is a part of a cross-section through the automobile along line II—II of FIG. 1 in greater detail.
Figure 3:
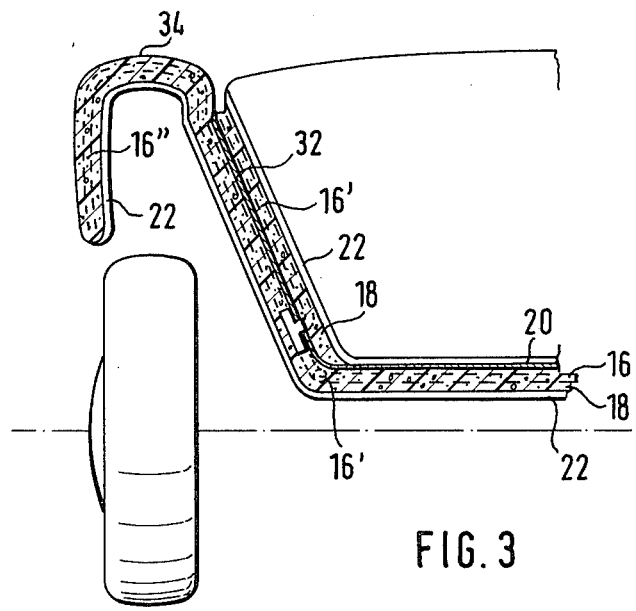
FIG. 3 is a section along line III—III of FIG. 1 showing a corrosion-protected fender.
Figure 5:
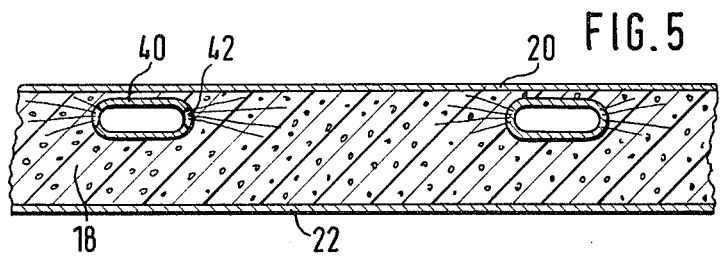
FIG. 5 is a section through a steel plate protected by an alternative anticorrosive system.

The needled tube portions 16′, 16″ of the manifold 12 are covered with a material layer 18 which according to FIGS 2, 3, 5 consists of an absorbent material as open-cellular expanded foam or a felt material. This material layer covers the respective steel surface to be protected. When the system is filled or refilled the anti-corrosive medium also penetrates into the capillary channels of the absorbent material layer 18 whereby a longtime protection of the steel surfaces 20 against corrosion is gained.

As shown in FIGS. 2 and 3, all steel sheets which form outer surfaces of the vehicle as the bottom wall 20 of the vehicle body and the fender wall 34 are covered with an absorbent material layer 18 and, moreover, layer 18 itself is covered by a fluid-tight barrier layer 22 to prevent evaporation of the anticorrosive fluid into the atmosphere and to provide mechanical protection. The fluid tight layer 22 is sprayed on to the absorbent layer 18 and adhered thereto.

As seen in FIG. 2, some of the branch tube portions 16′ run longitudinally within and along the lower hollow side profiles of the vehicle body. The needled tube portion 16′ lies in the lower region of the hollow profile which is most susceptible to corrosion and at least this lower region is filled with absorbent material as indicated.

Another branched off tube portion 16′ runs upwardly into a door post and ends in the lower half of it. This portion also is embedded into a mass of absorbent material. Because the profiles and posts form closed cavities, no fluid-tight barrier layers are necessary for the absorbent material.

From the tube portion 16′ within the hollow door post, a flexible tube is branched off leading into a double-walled door 29 and connected with a plurality of needled portions 16″ which immerse into a mass of absorbent material 30 which fills only the lower region of the door. But, in contrast to the aforementioned cavities, this mass of absorbent material 30 is covered by a fluid-tight barrier layer 31 in order to prevent an evaporation of the oil, which would condensate on the window.

According to FIG. 3, the branch tube 16 is also connected with needled tube portions 16′ and 16″. The first one runs along the inner surface of the vehicle body wall 32 enclosing the motor and can be ramified. The other tube portion 16″ runs along the outer surface of this body wall 32 to the lower edge of the fender 34 and is further divided too. All ramifications are needled as already mentioned and are covered by an absorbent material layer which in turn is covered and protected by an air-tight layer as explained above.

The ends of the tubes and tube portions are closed and it should be noted that the main tube has a larger cross-section than the branch tubes 16 and the tube portions branching off therefrom have the lowest cross-section. The absorbent material 18 is preferably coated by spraying a paste on the metal surface which during expansion forms an open-cellular hard foam adhering to the metal surface. Alternatively, a prefabricated layer of absorbent material can be punctually glued at the metal surface.

Figure 4:
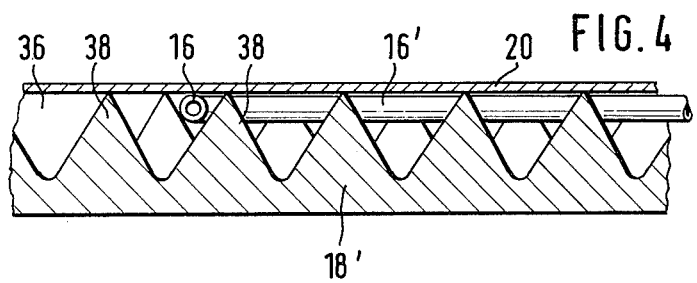
FIG. 4 is a section through a steel plate covered with a material layer and a channel system therebetween.

FIG. 4 shows another form of a distribution system for producing a longlife protective film on a metal surface 20. The branch tube 16 and branched off tube portions are covered by material layer 18′ which need not be of open-cellular structure. This layer is provided with a plurality of protrusions 38 the tips thereof are adhered to the metal surface 20 whereby flow channels 36 are formed which are in fluid-connection with the bores in the tube portions 16′.

FIG. 5 shows the embodiment of the tubes and tube portions 16′ for use in connection with flat metal surfaces as in the case of the body bottom wall or of the fender wall. In order to reduce the thickness of the coating, the tube and tube portions, or both, have a flat profile 40 and are provided with two rows of bores or holes 42 symmetrically arranged with respect to the longitudinal contact line between the tube and the metal surface 20 and provided in that half of the tube facing the metal surface. The thickness of the material layer 18 can be made smaller.

It should be noted that the layer 18 or 18′ provides a storage system for an anticorrosive medium by which a self-regenerating protective film production of long life time is gained. The manifold 12 therefore need only be supplied after a long working period of one time or some times per year.

The invention is not limited to an external supply but a storage tank can be installed in the vehicle connected with a pressure generating device, for example, a hand-operated pump, in order to supply the distribution system with a rust preventing agent in great intervals.

FIG. 2 shows a hole 26 in the metal sheet 20 which serves ventilation and/or inspection purposes to check the degree of penetration of oil or the like in the absorbent layer. The hole 26 is closable by a cap or plug 28.

I claim:

1. An arrangement for producing and regenerating a protective fluid film on corrodible metal plate surfaces of automobiles, at least one main tube and a plurality of branch tubes connected to the main tube to form a manifold, a supply fitting mounted to the main tube to permit supply of anticorrosive fluid to the manifold, the plurality of branch tubes distributed over the metal plate surfaces and fixed thereon, each one of said plurality of branch tubes having a plurality of longitudinally spaced small outlet openings for passing anticorrosive fluid out of the manifold, further comprising a layer of an absorbent material covering the metal plate surfaces, and wherein the outlet openings of each one of the plurality of branch tubes open into said layer.

2. An arrangement as claimed in claim 1, wherein the layer of absorbent material is adhered to the metal plate surfaces.

3. An arrangement as claimed in claim 1, further comprising a fluid-tight barrier layer covering the layer of absorbent material.

4. An arrangement as claimed in claim 1, wherein the manifold is punctually fixed at the metal plate surfaces.

5. An arrangement as claimed in claim 1, wherein the plurality of branch tubes comprises ramifications respectively in form of an artery.

6. An arrangement as claimed in claim 1, wherein the layer of absorbent material consists of an open-cellular expanded foam.

7. An arrangement as claimed in claim 1, wherein the layer of absorbent material consists of felt.

8. An arrangement as claimed in claim 1, further comprising a cover layer covering the metal plate surfaces, said cover layer having a layer surface facing the metal plate surfaces, said layer surface including a plurality of spaced projections extended toward the metal plate surfaces and desity between flow channels, flow channels between adjacent projections, wherein the projections are adhered to the metal plate surface and the flow channels in fluid connection with the outlet openings of the plurality of branch tubes.

9. An arrangement as claimed in claim 1, further comprising a storage container filled with an anticorrosive fluid and connected to the supply fitting hand-operated pressure generating means, operatively connected to the storage container for supplying anticorrosive fluid to the manifold.

10. An arrangement as claimed in claim 1, wherein at least one of the metal plate surfaces has an opening for inspection or ventilation, and a removable plug to said opening.

11. An arrangement as claimed in claim 1, further comprising a layer of an absorbent material mounted to the metal plate surfaces, said layer having portions spaced from the metal plate surfaces to define a space therebetween, and wherein the outlet openings of each one of the plurality of branch tubes open into the space between the layer and the metal plate surfaces.

* * * * *